Nov. 11, 1969  D. R. BRANHAM ET AL  3,477,235
CANTILEVERED OFFSHORE STRUCTURE
Filed Dec. 11, 1967  9 Sheets-Sheet 1

Donald R. Branham
Richard J. Selfe
Ray W. Hester, Jr.
INVENTORS
James F. Weiler
BY William A. Stout
Dudley R. Dobie, Jr.
Henry W. Hope
ATTORNEYS United States Patent Office 3,477,235
Patented Nov. 11, 1969

3,477,235
CANTILEVERED OFFSHORE STRUCTURE
Donald R. Branham, Richard J. Selfe, and Ray W. Hester, Jr., Houston, Tex., assignors to Crestwave Offshore Services, Inc., New Orleans, La., a corporation of Delaware
Filed Dec. 11, 1967, Ser. No. 689,421
Int. Cl. E02b *17/00;* E21b *15/02;* E04b *1/34*
U.S. Cl. 61—46.5                                    14 Claims

ABSTRACT OF THE DISCLOSURE

An offshore structure is disclosed which is provided with a cantilever assembly carrying drilling apparatus, the cantilever assembly being mounted for horizontal movement on a deck structure beyond an outboard edge thereof while being supported by the deck structure. The cantilever assembly is supported near the outboard edge of the deck structure by rocker bearings and is held down near its aft end by rocker hold down bearings which distribute stresses uniformly over sections of the girders of the cantilever assembly thereby avoiding gouging of the aft ends of the girders into the desk structure. A cantilever subassembly is movably carried by the cantilever assembly the subassembly in turn movably supporting the drilling apparatus and being constructed and arranged to be skidded off the end of the cantilever assembly onto tracks of a stationary platform supported on the underwater ground.

Background of the invention

The present invention relates to offshore structures, and more particularly, to self contained mobile offshore structures provided with a cantilever structure extendable horizontally from the mobile platform over well locations for drilling, or servicing or working over existing wells and in which the drilling equipment may be supported from the mobile offshore structure or may be shifted as a unit onto an existing permanent platform and then back onto the mobile offshore structure.

In prior mobile offshore structures having a cantilever structure which moves in a generally horizontal direction outwardly of the platform the drilling equipment such as the derrick, draw works, rotary and rotary table and the like, referred to generally as the drilling equipment, and the associated machinery such as the mud tanks, mud pumps, generators, and the like; referred to generally as the machinery package, are all carried by the cantilever assembly, the machinery package serving as a counterbalance when the cantilever assembly is in extended position. This requires that this entire mass be shifted by the cantilever assembly across the platform with its attendant problems, disadvantages and tremendous load requirements, and also imposing greater loads on the legs nearest the drilling assembly and causing the soil bearing loads to become unequal thereby producing an unequal settling. This unequal settling causes a tilting of the entire structure reducing its safety factor against overturning from forces applied externally by nature, such as wave and wind loads from storms. It would be highly advantageous to provide a cantilever assembly which does not require a counterbalance and in which the machinery package is mounted on the platform structure and is not carried by the cantilever assembly and in which the drilling equipment is carried by the cantilever assembly thereby permitting greatly reduced load carrying capacity of the cantilver assembly with its attendant advantages. It would also be advantageous to provide cantilever offshore structure in which shifting of the cantilever to extended position does not impose loads on the legs nearest the drilling equipment to the extent to cause the sail bearing loads to become unequal.

In the cantilevered offshore structures of prior devices there has been a serious problem of stress concentration on the beams or girders of the cantilever assembly at the support point adjacent the outboard edge of the offshore structure beyond which the cantilever assembly is extended. This concentration of stresses at a single point on the cantilevered girder intensifies stresses and could cause failure. In addition, cantilevered assemblies deflect when in an extended position causing the aft ends of the cantilevered girders to gouge into the tracks upon which they are mounted or into the platform structure thereby inducing plate fractures and causing fatigue and failure. It would be highly advantageous to provide a cantilevered offshore structure which distributes the stress loads along substantial lengths of the cantilever beams and also eliminate the gouging of the cantilever girders at their aft ends into the tracks upon which the girders ride or into the platform structure.

It is also a problem in prior structures to move or skid a drilling equipment package onto a stationary platform supported on the underwater ground for either drilling, servicing or working over operations. In most of these platforms rails are provided to support the drilling equipment package, however, the space between such rails may vary from about 30 feet, to 40 feet or 45 feet. This causes load distribution and alignment problems. It would be highly advantageous to provide a c antilever subassembly which is so constructed and arranged that it may be skidded onto rails of varying widths and yet provide adequate support and load distribution for the cantilever subassembly even if misaligned.

Prior cantilevered type mobile offshore unites are restricted to a relatively small area for drilling when moved to a new drilling location. This required the mobile unit to be positioned very accurately before elevating at a considerable loss of time and money. If, after hours of precise positioning and elevating, it was found that the unit was not located in the exact drilling position, the mobile unit would have to be lowered back into the water, repositioned and re-elevated. It would be highly advantageous to provide a cantilever mobile offshore structure in which drilling or servicing equipment can be positioned in more than one direction to cover a large area without the necessity of moving the mobile offshore structure once it is elevated at a drilling location.

Summary

The present invention is directed to an improved mobile offshore structure in which the machinery package is carried by the deck structure and in which the drilling equipment is carried by the cantilever assembly thereby avoiding the problem and disadvantages of moving the tremendous loads of the machinery package, and at the same time maintaining the center of gravity of the unit to prevent unequal settlement.

The present invention is also directed to an offshore structure having a cantilever assembly carrying drilling equipment in which it is unnecesary to also carry the machinery package as a counterbalance.

The present invention is also directed to an offshore structure in which the stress loads are distributed along a substantial area of the girders of the cantilever assembly thereby eliminating stress concentrations and their attendant disadvantages and problems.

The present invention is also directed to an offshore structure provided with a cantilever subassembly carrying drilling equipment which may be moved independently onto a stationary platform having rails of varying spacing yet provides good and sufficient load distribution.

The present invention is also directed to a cantilevered offshore platform in which the cantilever asembly may be cantilevered outwardly of the platform a substantial distance and which carries a cantilever subassembly mounted for movement on the cantilever tructure, as well as being able to skid the cantilever subassembly onto a stationary platform supported by the underwater ground which cantilever subassembly carries a drilling assembly movable laterally so that a relatively large area may be drilled, serviced or worked over without moving the barge and while supporting them from the barge, or, if desired, supporting the drilling equipment on a producing platform in the water.

It is therefore an object of the present invention to provide an offshore platform provided with a cantilever assembly carrying a minimum of drilling equipment and not requiring auxiliary drilling equipment and machinery, such as mud tanks, mud pumps, generators and the like, to be carried by the cantilever assembly thereby providing a lighter, less expensive, and easier moved cantilever assembly less subject to fatigue, failures and problems involved in shifting tremendous masses of equipment.

A further object of the present invention is the provision of rocking type forward bearings supporting the forward end of the cantilever assembly and rocking type hold down bearings holding down the aft end of the cantilever assembly which rock sufficiently to assume the general slope of the girders of the cantilever assembly and distribute the stresses at these points over a substantial area of the cantilever girders thereby avoiding stress concentrations and their attendant problems.

Still a further object of the present invention is the provision of a cantilevered offshore structure in which the hold down aft end of the cantilever assembly is arranged to provide sufficient clearance so that the aft ends of the girders of the cantilever assembly do not gouge into the track upon which they slide or into the platform structure thereby avoiding stress concentrations in the platform and girders of the cantilever structure which would be caused thereby.

Yet a further object of the present invention is the provision of a cantilevered offshore platform in which the cantilever assembly may be extended a substantial distance out from the offshore structure and which carries a cantilever subassembly mounted for movement thereon and which in turn carries a drilling assembly mounted for lateral movement thereon so that a wide area of drilling, servicing or working over of wells may be provided without moving the offshore structure and, if desired, without placing any weight upon platforms supported on the underwater ground.

Yet a further object of the present invention is the provision of a cantilevered offhore structure in which the cantilever assembly may be extended a substantial distance from the offshore structure and which carries a cantilever subassembly movably mounted thereon, which, inturn, carries a drilling assembly in which the subassembly is arranged and constructed so as to be shifted or skidded onto rails of offshore platforms of varying spacing and yet at the same time provide even load distribution and support for the cantilever subassembly.

Other and further objects, features and advantages will be apparent from the following description of preferred embodiments of the invention.

Description of the preferred embodiments

Figure 2:
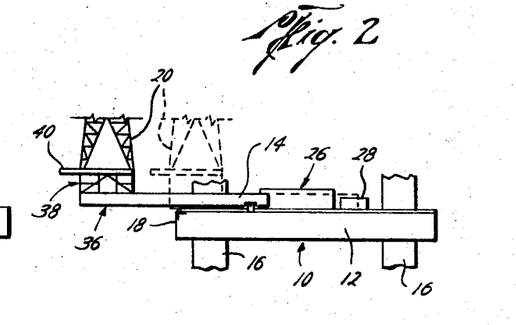
FIGURE 2 is a schematic side view illustration of the cantilevered offshore structure of the present invention.

Referring now to the drawings, and particularly to FIGURE 2, an offshore structure generally indicated by the reference numeral 10 is illustrated which is provided with a deck structure 12 upon which is mounted a cantilever assembly 14 according to the present invention. As illustrated in FIGURE 2, the offshore structure 10 is of the self elevating type so that the deck structure or working platform 12 can be elevated above the water level with the base of the structure, not shown, supported on the underwater ground. For this purpose the legs 16 are illustrated, only two being shown in this view, and suitable means, not shown, may be utilized to raise and lower the deck structure 12 with respect to the legs 16. If desired, the platform may be of the dock type, that is the base, not shown, and the working platform or deck structure may be fixed relative to one another. Since the offshore platform, legs, base and various component parts as such do not constitute the present invention and any desired arrangement of these parts may be utilized, no further description thereof is deemed necessary or given.

Referring still to FIGURE 2, the cantilever assembly 14, which is illustrated in extended cantilevered position beyond the outboard end 18 of the deck structure 12 carries the derrick 20, the engines 21, draw works 22, tank 23 (see FIGURES 5, 6 and 19) and rotary table 24, as well as other drilling equipment. What might be referred to as a machinery package 26, however, which includes mud tanks 28, and as illustrated in FIGURE 6, includes the generators 30, mud pumps 32, is mounted on the deck structure 12 between the tracks 35 on which the cantilever assembly 14 is moved. The mud pumps, generators, compressor, not shown, and the like, are all connected to the drilling equipment carried by the cantilever assembly 14 by flexible conduits, not shown. If desired, the generators 30, mud pumps 32 and other equipment may be contained in the housing 34 illustrated in FIGURES 2, 5 and 6.

Figure 5:
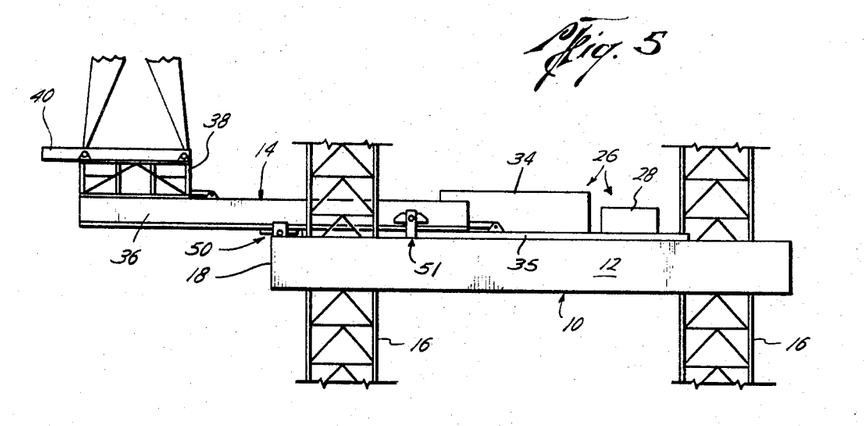
FIGURE 5 is a side view of an offshore structure according to the invention illustrating the cantilever assembly in an extended position and illustrating the rocker type bearings and hold downs for the cantilever assembly.
Figure 6:
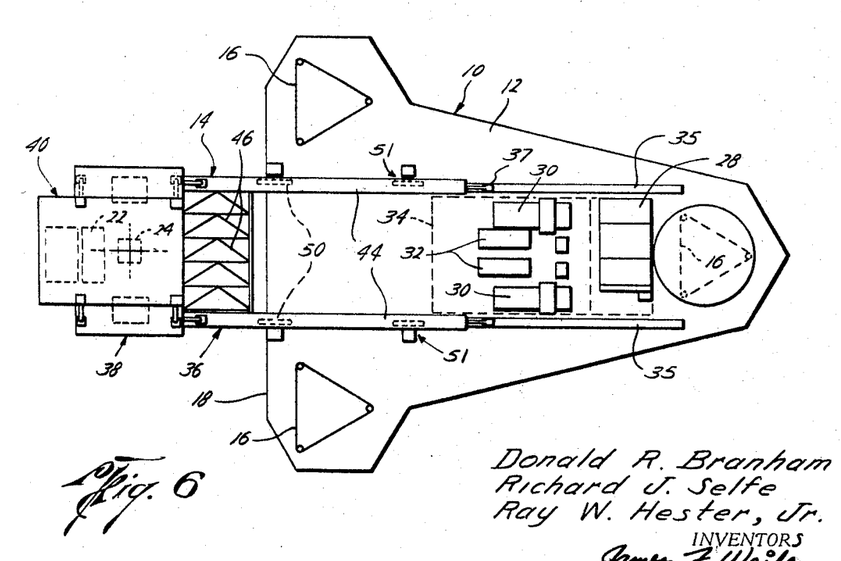
FIGURE 6 is a plan view of the offshore structure illustrating the cantilever assembly and subassembly in extended position.
Figure 7:
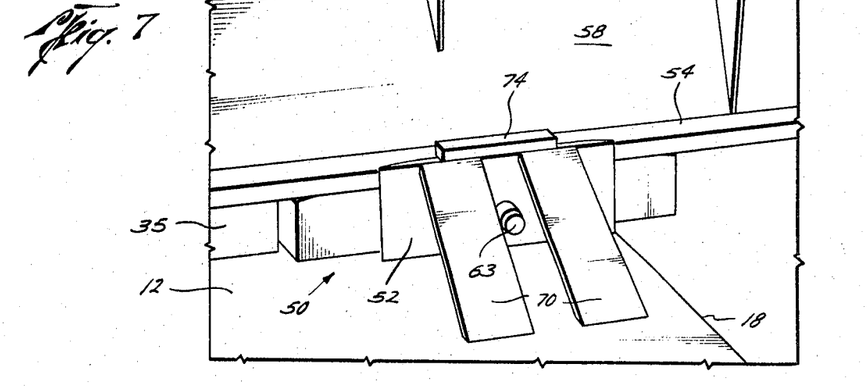
FIGURE 7 is an enlarged, fragmentary, perspective view illustrating a rocker type bearing support assembly for the forward end of the cantilever assembly.
Figure 19:
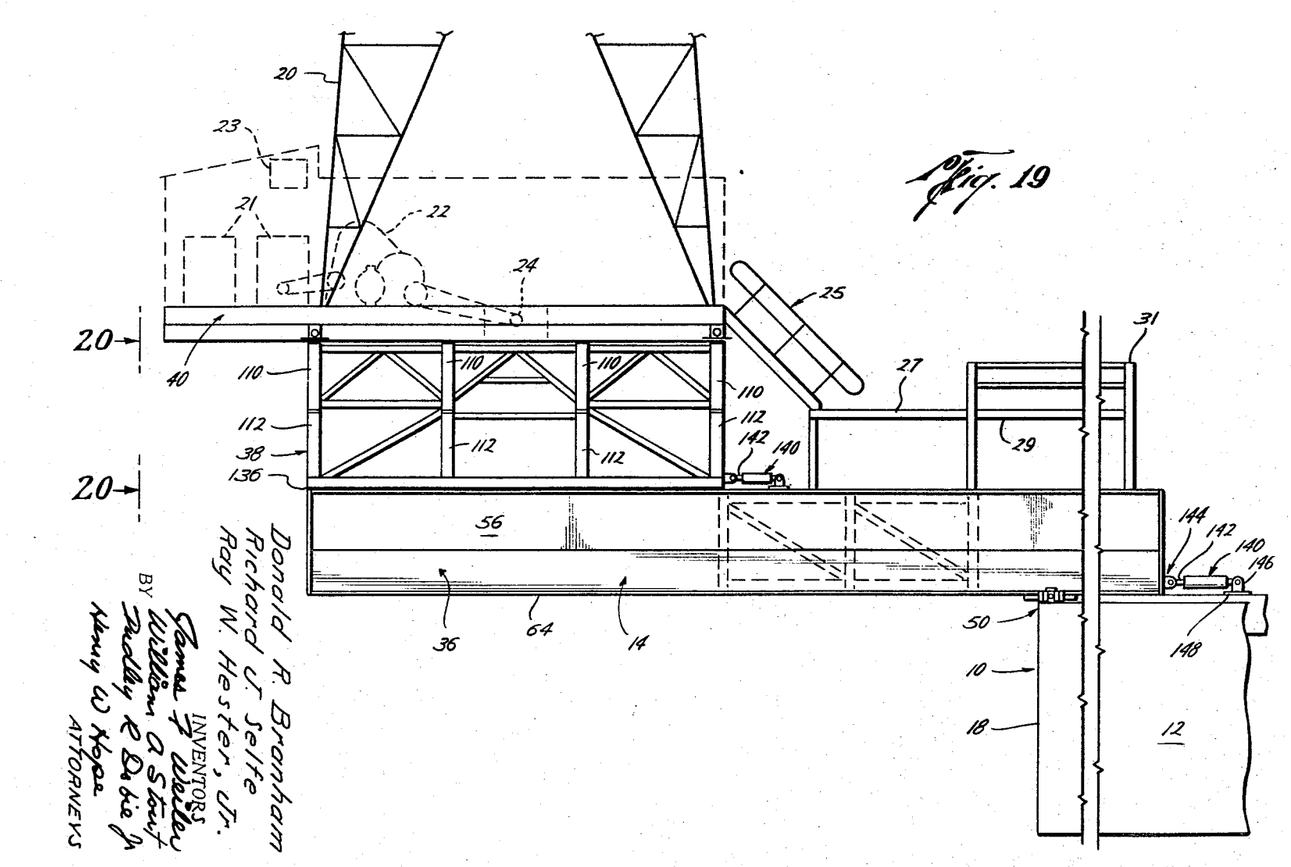
FIGURE 19 is an enlarged side view of the cantilever assembly, such as illustrated in FIGURE 5 in more detail.

If desired, the drilling package including the derrick 20, engines 21, draw works 22, tank 23 and rotary table 24, as well as auxiliary drilling equipment, may be mounted directly on the forward end of the cantilever assembly 14; preferably, however, the cantilever assembly includes a cantilever assembly 36, a cantilever subassembly 38 mounted for longitudinal movement on the cantilever assembly 36, and a drilling assembly 40 mounted for lateral movement on the cantilever subassembly 38, as illustrated in FIGURE 2 and as shown in more detail in FIGURES 5, 6 and 19.

As illustrated in FIGURE 6, the cantilever assembly 36 is arranged in the form of two elongated leg-like members 44 thereby providing an open area 37 at its aft end, which are disposed above the tracks 35 carried by the deck structure 12 of the offshore structure 10 and are spaced appreciably apart so that when in retracted position they will straddle or go in between parts of the machinery package 26. The forward end of the cantilever assembly 36 is provided with a series of cross and bracing members 46 and, as previously mentioned, movably mounted on this braced forward end is a cantilever subassembly 38 and drilling assembly 40.

Thus, the cantilever assembly 36 can be positioned in retracted position by straddling or going in between machinery and equipment mounted on the deck structure 12 and can be cantilevered into extended position outboard of the deck or platform 12 and provide a very compact and efficient yet self contained cantilever assembly for the drilling, servicing and working over of oil wells without the necessity of having to move the equipment in the machinery package with the attendant strength and load requirements and problems created thereby.

Referring now to FIGURES 5 and 6, there are disposed at the outboard end 18 of the deck structure 12 of the offshore structure 10 a pair of rocker type bearing assemblies 50 and adjacent the aft end of the legs 44 of the cantilever assembly 36 a pair of rocker type hold down assemblies 51 which permit extension and retraction of the cantilever assembly 36 without setting up concentrations of stresses at any point and provide a hold down for the cantilever assembly 36 when in extended position without the necessity of a counterbalance or counterweight such as those utilizing the machinery package as a counterweight with all its attendant difficulties and inherent disadvantages.

Figure 8:
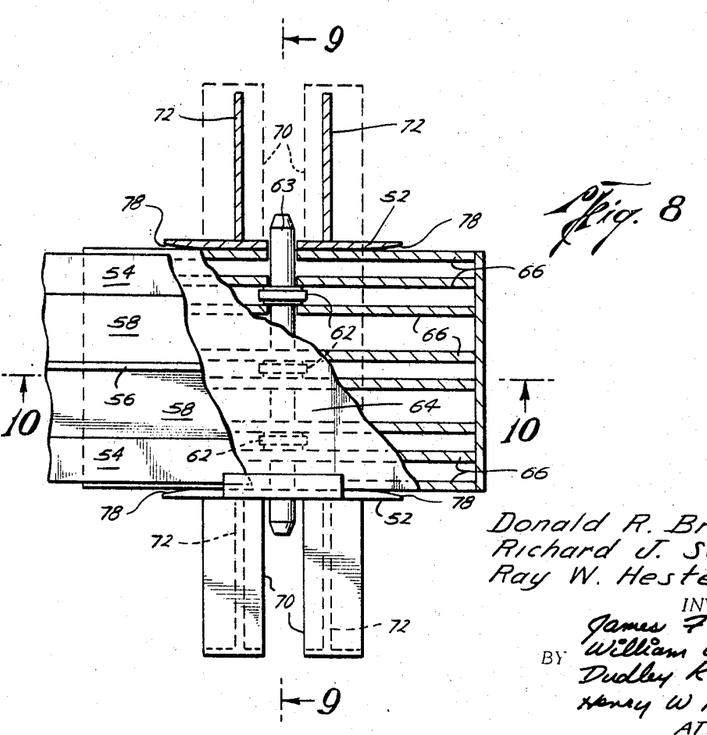
FIGURE 8 is a plan view, with parts broken away, of the forward bearing rocker support assembly.
Figure 9:
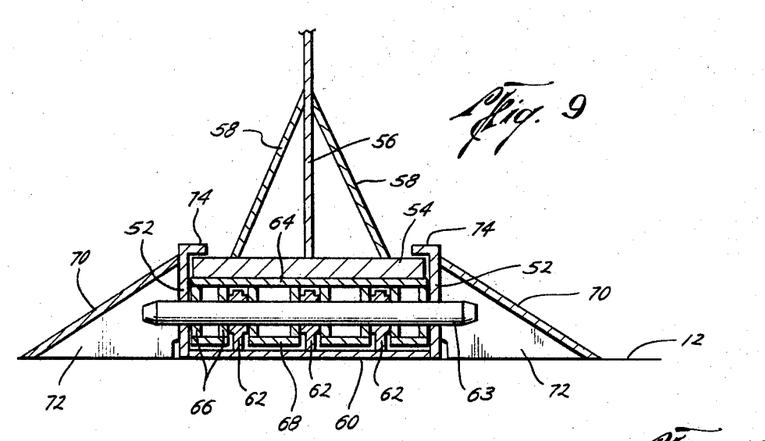
FIGURE 9 is a transverse sectional view of the rocker bearing support assembly taken along the line 9–9 of FIGURE 8.

The details of the bearing support assemblies 50 are best illustrated in FIGURES 7 through 11. In FIGURE 9, the various parts which are secured together, such as by welding, to form a unitary part are cross-hatched the same for clarity of reference.

With reference now to FIGURES 8 and 9, each bearing support assembly 50, only one being shown, includes a pair of upstanding side members 52 which are disposed in spaced parallel relationship to one another and of a width sufficient to permit passage between them of the skid base 54 of the girder 56 and side braces 58 of the cantilever assembly 36. The side members 52 are rigidly secured to the deck 12, such as by welding.

As best seen in FIGURE 9, disposed across the deck between the side members 52 is a base plate 60 having upstanding therefrom a plurality of bearing members 62. The side plates 52 and the intermediate bearing members 62 are provided with an aligned opening extending transversely through them through which the bearing pin 63 is rotatably disposed.

An elongate plate-like bearing track member 64 extends transversely between the side members 52 and has the depending bearing and support members 66 and base members 68 through which are provided an opening aligned with the opening in the members 52 and 62 for reception of the bearing pin 63. Thus, a limited rocking movement is permitted by the bearing assembly so that the bearing surface 64 upon which the skid plate 54 of the girder 56 of the cantilever structure 36 assumes generally the same slope as the cantilever structure and yet the load, and hence the stress, is distributed along a considerable length of the skid member 54 thereby distributing the load and stress along a substantial length of the girder system of the cantilever assembly 36.

Figure 10:
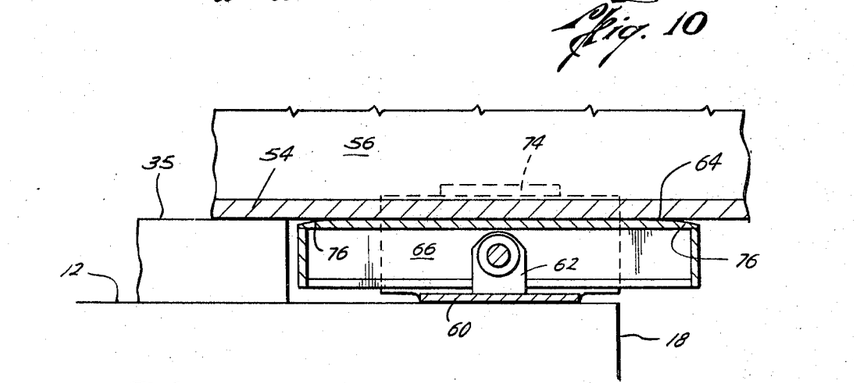
FIGURE 10 is a longitudinal sectional view of the forward rocker type bearing support assembly taken along the line 10–10 of FIGURE 8.
Figure 11:
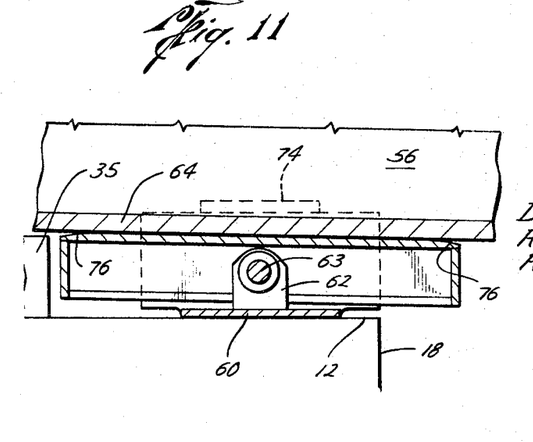
FIGURE 11 is a view similar to that of FIGURE 10 illustrating the bearing support rocked into alignment with and in the same general inclination as the supported girder in the cantilever assembly.
Figure 12:
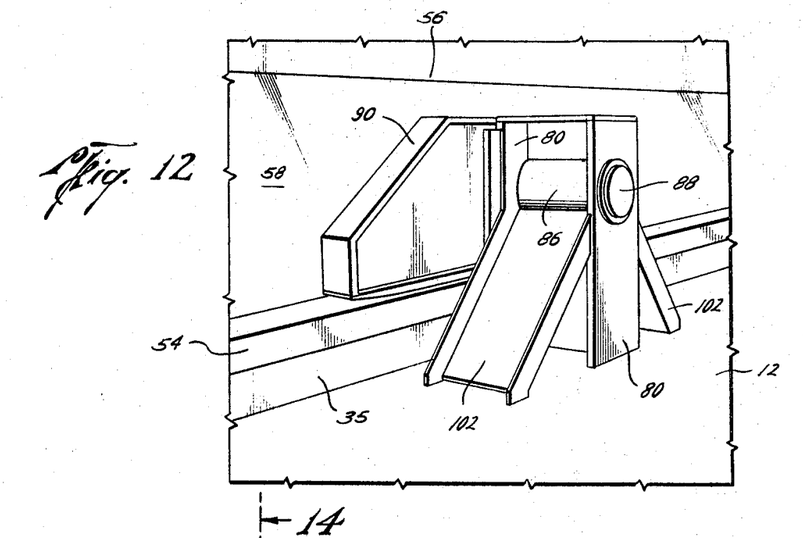
FIGURE 12 is an enlarged, fragmentary, perspective view of the rocker hold down assembly.
Figure 13:
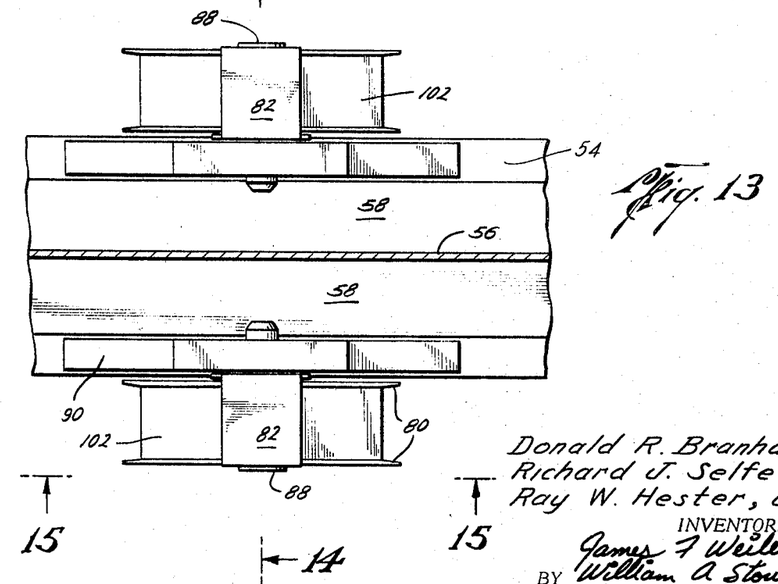
FIGURE 13 is a plan view of the hold down assembly illustrated in FIGURE 12.

The side members 52 are suitably braced, such as by the angularly-extending braces 70 and transversely extending braces 72. Disposed at the upper end of each of the side members 52 is a longitudinally-extending member 74 which extends inwardly over the skid plate 54 but with sufficient clearance to permit a limited rocking action. Also, as best seen in FIGURES 10 and 11, the forward and aft ends of the bearing plate 64 are tapered downwardly and outwardly as at 76 to facilitate sliding of the girder skid plate 54 on the bearing plate 64. Similarly, the upstanding side members 52 are tapered at their fore and aft ends as at 78, best illustrated in FIGURE 8, to facilitate the sliding movement of the girder skid member 54. Thus, the pivoted or rocking bearing plates 64 constitute extensions of the tracks 35 at the outboard end 18 of the deck structure 12 and accommodate the sloping of the cantilever assembly 36 and distribute the load and stresses over a large area of the cantilever girders 56 and cantilever assembly 36.

Fittings and other provisions for lubricating the bearing assemblies 50, as well as safety pins and the like, not shown, are utilized.

Figure 14:
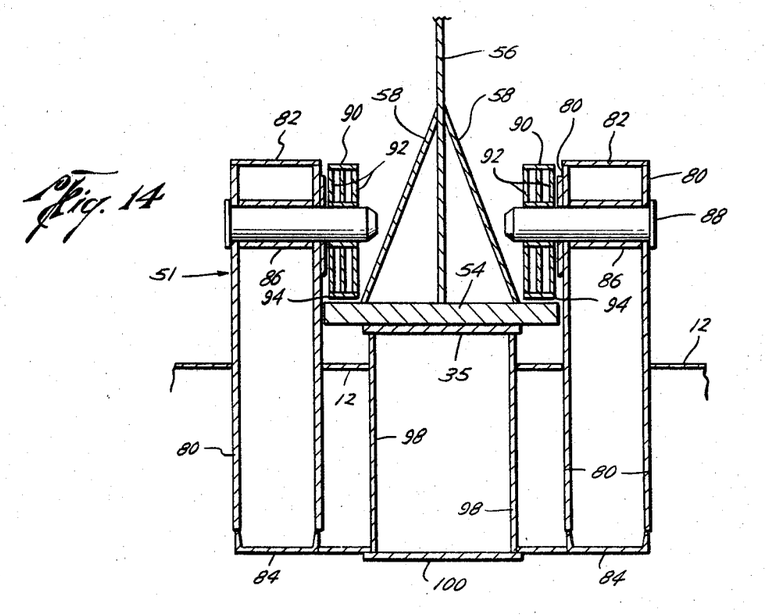
FIGURE 14 is a transverse sectional view of the rocker hold down assembly taken along the lines 14—14 of FIGURE 13.

The details of the rocker type hold down assemblies 21 are illustrated in FIGURES 12 through 15, to which reference is now made. In FIGURE 14, as in FIGURE 9, the various parts which are rigidly secured together into a single unit are cross-hatched the same for convenience of reference and clarification purposes.

Figure 15:
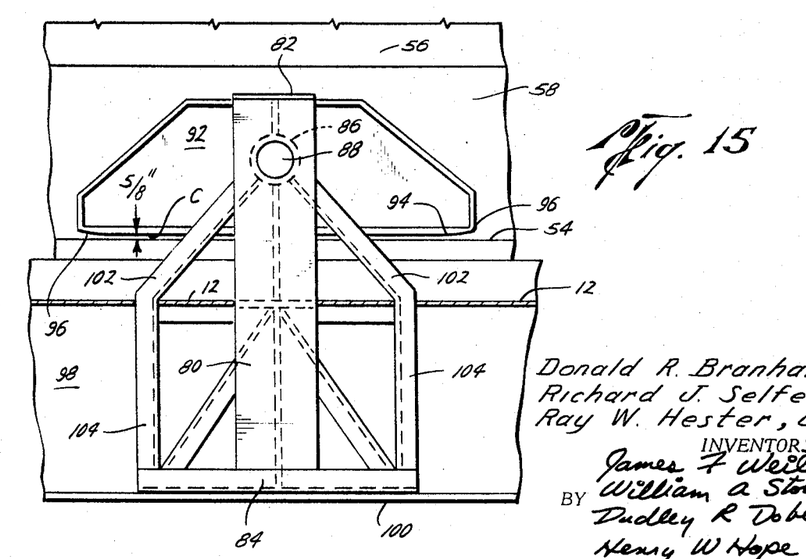
FIGURE 15 is a side view of the hold down assembly taken along the line 15—15 of FIGURE 13.

Each rocker type hold down assembly 51 includes a pair of upstanding, longitudinally-extending bearing support members 80 which are rigidly secured to the deck structure 12 and extend into its beam structure. An upper plate 82 is provided for each of the support members 80 as well as a lower plate 84, as best illustrated in FIGURES 14 and 15. A bearing 86 is provided extending through and transversely to the skid rail of track 35 and skid plate 54 of the girder 56 of the cantilever assembly 36 through which rotatably extends the bearing pins 88.

Secured to the inner ends of each of the bearing pins 88 are a pair of elongate hold down members 90 provided with the longitudinally-extending beams 92 and a lower elongate plate-like bearing surface 94 which extends generally parallel and over the girder skid base 54 a substantial distance.

As best seen in FIGURE 15, it is critical that sufficient clearance C be provided between the lower bearing surface 94 of the rocker hold down assembly 51 and the upper surface of the cantilever base skid member 54 so that when the cantilever assembly is extended beyond the outboard end 18 of the platform 10 the bending of this structure will not concentrated loads and dig in and thereby cause stresses in the deck structure 12 adjacent the aft ends of these members as well as additional stresses in the hold downs 51. It has been calculated and subsequently substantiated that the amount of clearance depends on the stiffness of the cantilever assembly. Clearance should be such that the bending of the cantilever girders 58 or other parts of the cantilever assembly 36 will not cause them to dig into the deck structure 12 and impose a load on them yet, at the same time, a minimum of movement for stability purposes should be provided.

In order to facilitate ease of movement of the skid base plate 54 the forward and aft ends of the hold down bearing plates 94 are outwardly and upwardly tapered as at 96, as best seen in FIGURE 15.

Referring now to FIGURE 14, a pair of box beams 98 is provided to support the track or rail 35 upon which the girder slide 54 slides, wihch box beams 98 are connected at their lower ends by a transversely-extending base beam member 100. The side supporting members 80, base member 84, and box beam members 98 as well as base member 100 are all interconnected together with the deck structure 12 as illustrated to form a strong, rigid supporting structure for the hold down rocker arms 90 and to support the skid tracks 35.

To provide additional support for the support structure for the hold down rocker arms 90 there are provided downwardly and outwardly-extending support arms 102 which are connected to the downwardly extending support arms 104 which in turn are connected to the base members 84.

Thus, the hold down rocker assembly permits sliding movement of the girder slide member 54 and assumes the same slope as the girder slide member 54 when the cantilever assembly slopes in extended position and at the same time prevents the aft ends of the girder members 56 of the cantilever assembly from digging in and applying a load to the deck structure 12 or other structural members of the offshore structure 10.

In some instances it is desirable to shift the cantilever assembly 38 carrying the drilling platform 40, onto an offshore structure supported on the underwater ground for the purpose of servicing, working over, or perhaps, drilling additional wells. Most of these installations at the present time have rails for skidding drilling equipment onto and off of them. The spacing between the rails varies, however, and are generally spaced at 30, 40 and 45 feet. The girder and beam structure of the cantilever subassembly 38 is arranged to be skidded onto rails of these varying spacings and to adequately support and distribute the loads and stresses over the supporting girder and beam structure for safe operations. Such an arrangement is best illustrated in FIGURES 19 and 20.

Figure 20:
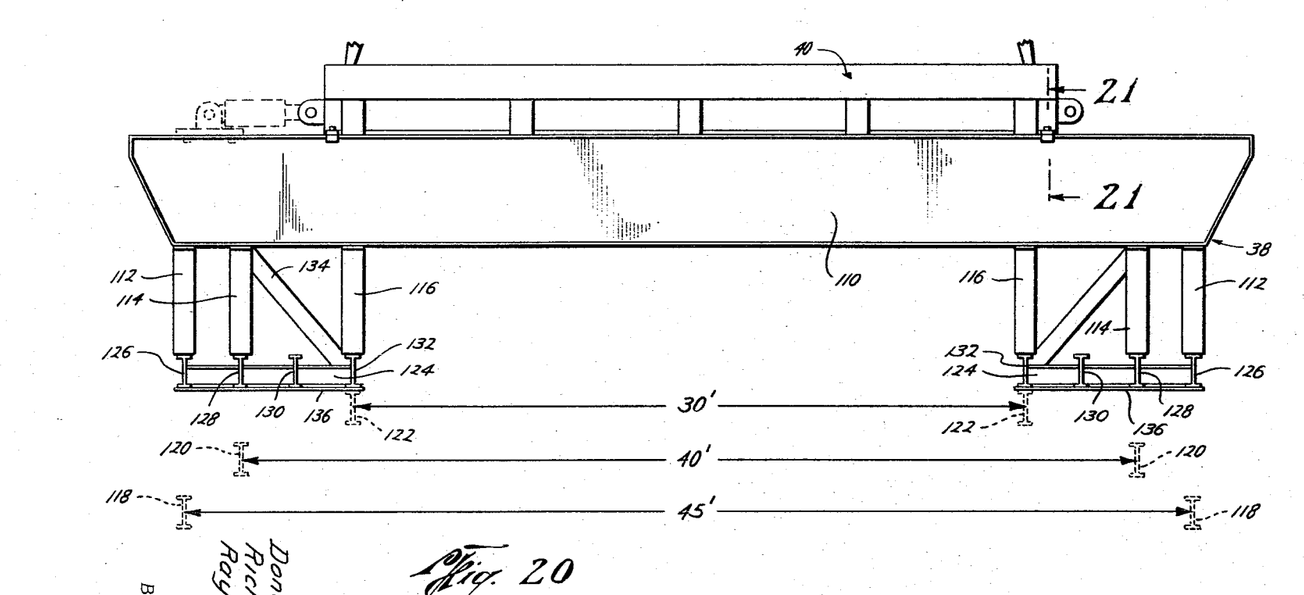
FIGURE 20 is a view of the outboard end of the cantilever subassembly taken along the line 20—20 of FIGURE 19 illustrating the arrangement for supporting the cantilever subassembly on rails of varying width on offshore structures onto which it may be skidded and providing for adequate load support and distribution.
Figure 21:
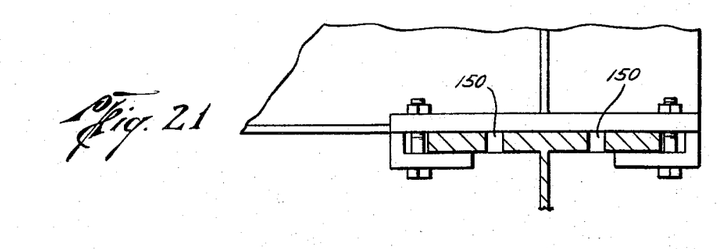
FIGURE 21 is a fragmentary side view illustrating slots for walking hydraulic cylinders for extending and retracting the cantilever and drilling assemblies.

The cantilever subassembly 38 includes a plurality of transversely-extending girders 110, which are suitably interconnected and braced as shown, which girders 110 are supported by a plurality of longitudinally-extending sets of girders 112, 114 and 116, as best illustrated in FIGURE 20. The innermost set of girders 116 are spaced 30 feet apart, the intermediate set of parallely-spaced girders 114 are spaced 40 feet apart, and the outermost set of girders 112 are spaced 45 feet apart. The width of each of these sets of girders correspond with the rails 118, 120 and 122 disposed on the platform. The girders 112, 114 and 116 are interconnected together by the transversely extending beams 124 and the upstanding H-beams 126, 128, 130 and 132. Also, suitable diagonal bracing 134 is provided between the girders 114 and 116 and the cross beam 124.

A longitudinally-extending skid plate 36 is provided at the lower portion oft he H-beams 126 and cross beam 124.

Thus, the cantilever substructure 38 may be readily skidded onto a platform having a set of rails of varying widths between them such as the rails 118, 120 and 122 and provide safe and adequate distribution of the loads involved.

Referring now to FIGURE 19, the cantilever and drilling assemblies are illustrated in more detail. As previously mentioned, the drilling assembly 40 carries the necessary drilling equipment, which includes the derrick 20, engines 21, the draw works 22, the tank 23 and the rotary 24. Also carried by the drilling platform assembly are a shale shaker, an auxiliary small mud tank, both of which are not shown, the usual crown and traveling block, kelley, kelley bushing, tubing tongs and the like required in drilling, servicing or working over wells, none of which are shown and all of which are conventional oil well equipment used for this purpose.

A pipe ramp and stairs generally indicated by the reference numeral 25 are also carried by the cantilever assembly 38, which ramp and stairs 25 are secured at one end to the drilling platform assembly 40 and at the other end to a removable extension 27 of a pipe rack 29 carried by the cantilever assembly 36, which pipe rack 29 is provided with a pipe stop 31 at its aft end.

The various cantilever assemblies may be moved by any desired means, preferably however, and as illustrated in the various figures, but with reference to FIGURE 19, hydraulic jacks generally designated by the reference numeral 140 are utilized for this purpose. Preferably these are of the so-called "walking" type which are well known and readily available on the commercial market. The rams 142 of these jacks are connected to the structural members of the cantilever assemblies by pivot assemblies generally indicated by the reference numeral 144. The other ends of the hydraulic jacks 140 include body members 146 provided with the bases 148 which have depending lugs, not shown, which fit into a series of slots 150, such as illustrated in FIGURE 20, along the tracks upon which the slide members of each of the cantilever assemblies slide. Hydraulic pressure is provided from a suitable source, not shown, and connected by a flexible conduit. Since these walking jacks are readily available on the commercial market, and, as such, do not constitute the present invention and any suitable means may be utilized to move the various cantilever and drilling assemblies, no more description of these jacks is given or deemed necessary.

In operation the offshore structure 10 is floated to location. The legs 16 are lowered to rest on the underwater ground and to provide support for the structure. The deck 12 is then elevated by any suitable means on the legs 16 above the surface of the water. Preferably, when floating to location, lowering the legs 16 to the underwater ground to provide such support and then elevating the deck 12 the cantilever assembly 14 is in retracted position as shown in the block diagram of FIGURE 16 and in dotted lines in FIGURE 2.

Figures 16, 17:
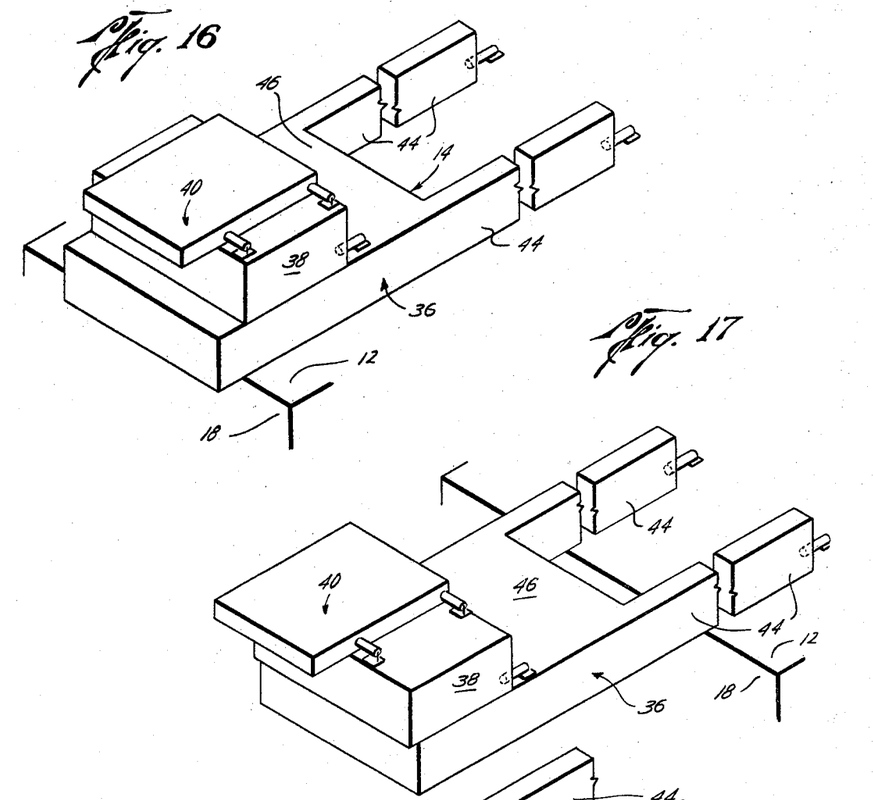
FIGURE 16 is a diagrammatic illustration, in perspective, of the cantilever assembly, subassembly and drilling assembly in retracted or inboard position.
FIGURE 17 is a diagrammatic illustration, in perspective, similar to that of FIGURE 16, illustrating the cantilever assembly and subassembly in extended or cantilevered position outboard of the offshore structure and the drilling assembly shifted laterally on the cantilever subassembly.

The cantilever assembly 14 may then be extended beyond the outboard end 18 of the offshore structure 10 by means of actuating the walking jacks 140. The main cantilever assembly 36, preferably, is first extended to place the drilling platform assembly 40 generally over the desired location, such as a drilling site, or a well to be serviced or worked over. If desired, or if necessary, the drilling platform assembly 40 may be shifted laterally by actuation of the hydraulic jacks 140 as illustrated in FIGURE 17 in order to provide a new drilling site or to align it with a well to be serviced or worked over. If necessary, the cantilever substructure 38 may be shifted to locate the drilling assembly 40 were desired.

Figure 18:
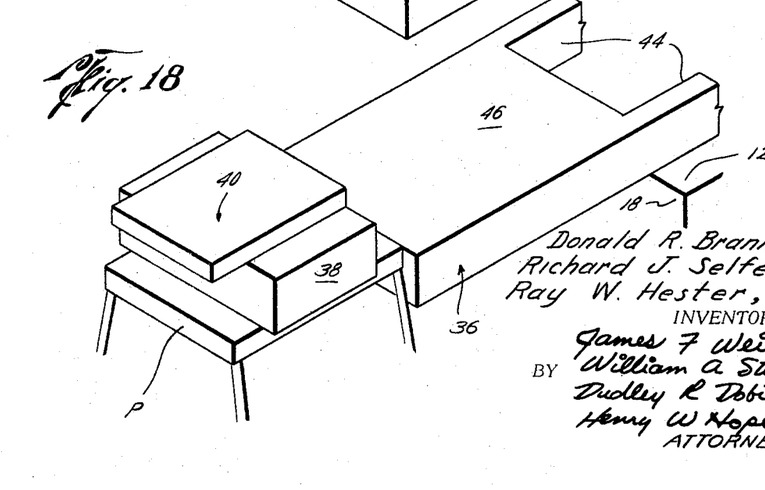
FIGURE 18 is a diagrammatic illustration, in perspective, similar to that of FIGURES 16 and 17, illustrating the cantilever subassembly shifted or skidded onto an offshore platform supported by the underwater ground.

If desired, and as illustrated in FIGURE 18, to which reference is now made, the cantilever substructure assembly 38 may be completely shifted off the main cantilever assembly 46 onto a stationary platform P supported from the underwater ground for servicing or working over the well. As previously mentioned, the girders of the cantilever substructure 38, as illustrated in FIGURE 20, and skid plates provided in connection therewith, permits the cantilever structure 38 to be transferred to a platform having tracks of varying spacings and even though the platforms may be misaligned with the cantilever assembly.

Figure 3A:
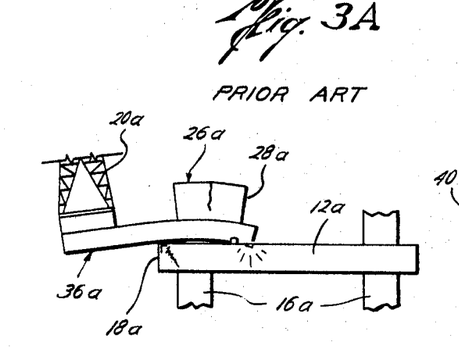
FIGURE 3A is a schematic side view illustration of the prior art similar to that of FIGURE 1 illustrating the setting up of stresses in the cantilever assembly and related equipment and structure.
Figure 3B:
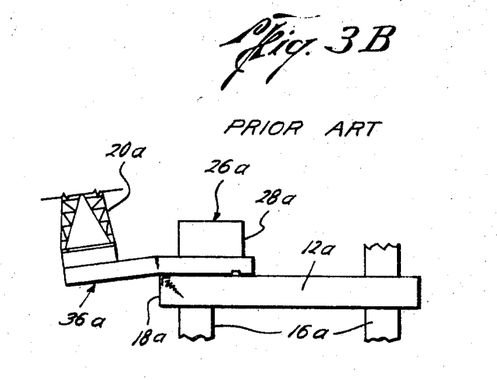
FIGURE 3B is a view similar to that of FIGURE 3A indicating where failure is invited due to stresses set up in the cantilever assembly of the prior art.
Figure 4:
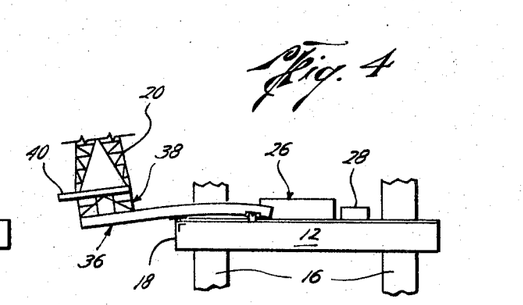
FIGURE 4 is a schematic side view of a cantilevered offshore structure according to the present invention illustrating effective load distribution and elimination of gouging of the aft portion of the cantilever assembly into the deck structure when the cantilever assembly is extended.

While the cantilever assembly 36 carries enormous loads, the rocker bearing assemblies 50 and rocker hold down assemblies 51, with the clearance previously mentioned, distribute the stress over a substantial area of the girders 56 of the cantilever assembly 36 and prevents crimping at the outboard end 18 of the offshore structure caused by stress thereon, and also prevents the aft ends of the griders 56 from digging into the structural members of the deck thereby avoiding stress concentrations at any one point. This is in contrast to cantilever structures of this same general type of prior art, which are diagrammatically illustrated in FIGURES 1, 3A and 3B, to which reference is now made. When the prior art structures are in extended or cantilevered position, and as best seen in FIGURES 3A and 3B, the load or stresses are concentrated at one point on the cantilever girders or beams and the aft end of the beams digs into the track or other structural members of the platform thereby setting up stress along the entire cantilever assembly thereby inviting failures. These stresses are eliminated by the rocker bearing assemblies and rocker hold down assemblies together with the clearance provided, all previously mentioned.

Figure 1:
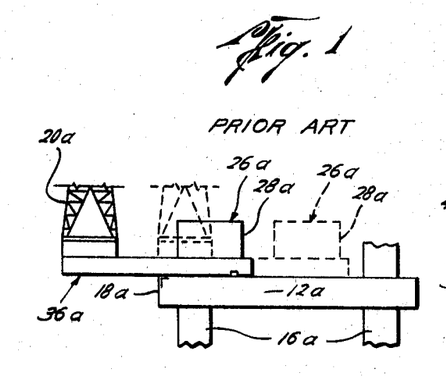
FIGURE 1 is a schematic side view illustration of a cantilevered offshore structure of the prior art.

As illustrated in the drawings, the cantilever assembly 14 of the present invention is not counterbalanced, the hold down assemblies 51 serving the purpose of holding the aft end down on the overbalanced cantilever assembly when it is in cantilevered or extended position. If desired, however, the drilling and servicing equipment may be rearranged on the cantilever assembly 44, for example, the draw works could be located in the main cantilever assembly 36. The arrangement of the cantilever assembly 14 is such that it may be retracted about machinery which is located on and carried by the deck of the structure rather than having to be carried by the cantilever assembly thereby considerably lessening the enormous loads carried by the cantilever assembly. This is diagrammatically brought out in FIGURES 1 and 2 where, as shown in FIGURE 1, the entire mass of machinery, which is utilized to counterbalance the cantilever assembly, must be shifted across the platform; whereas, as illustrated in FIGURE 2, this mass is located on the deck 12 and is not shifted thereby greatly reducing the load on the cantilever system and thereby eliminating the problems and disadvantages thereof.

After the well has been drilled, serviced or worked over, the walking jacks 140 are actuated to first move the drilling platform 40, if necessary, into a central position, and then retract the cantilever assemblies 36 and 38 to the position illustrated in FIGURE 16. In the event the cantilever substructure 38 and drilling assembly 40 have been shifted onto the platform P they are first retracted onto the cantilever assembly 36 and then the cantilever assembly 36 is retracted to the position illustrated in FIGURE 6 and as shown in the dotted lines in FIGURE 2. The deck 12 may then be lowered into the water, if of the self elevating type, the legs 16 of the offshore structure 10, are elevated and the offshore structure 10 floated to another location.

In the case of a dock type offshore structure, the offshore structure 10 is simply floated and then floated to another location.

While the cantilever assemblies are particularly adapted for use on mobile offshore structures, they may of course, be supported on any desired structure, mobile or fixed, for over the side drilling, servicing, workover or other operations.

The present invention, therefore, is well suited and adapted to attain the objects and ends and has the advantages and features mentioned as well as others inherent therein.

Numerous changes may be made in the details of construction and arrangement of parts which are encompassed within the invention as defined by the scope of the appended claims.

What is claimed is:

1. An offshore structure provided with a deck structure above the surface of the water comprising:

a cantilever assembly carrying a derrick, draw works and rotary table,     spaced parallel track means for mounting the cantilever assembly on the deck structure for horizontal movement of the forward end of the cantilever assembly outwardly beyond an outboard edge of the deck structure and for retracting it to its initial position, and     forward bearing support means for slidably supporting the cantilever assembly, said means including at least a pair of elongate bearing plates pivotally carried by the deck structure adjacent the outboard edge engaging and supporting the assembly near the outboard end and distributing the stresses thereof in the cantilever assembly throughout the area of said bearing plates, said bearing plates pivoting to assume the same slope as the portion of the cantilever assembly engaged.

2. The offshore structure of claim 1 including additionally hold down support means for slidably holding down the cantilever assembly, said means comprising:

at least a pair of hold down assemblies mounted on the deck structure adjacent the aft end of the cantilever structure when in extended position,     each of said hold down assemblies including a pivoted elongate bearing plate arranged to bear down against and thereby hold down the aft end of the cantilever assembly and to distribute the stresses thereof in the cantilever assembly throughout the area of said bearing plates, said bearing plates pivoting to assume the same slope as the portion of the cantilever assembly borne down against.

3. The offshore structure of claim 2 where the bearing plates of the hold down assemblies are spaced a sufficient distance above the cantilever portion borne down against to prevent the aft end of the cantilever assembly from applying a load to the deck structure caused by bending of the cantilever assembly.

4. The offshore structure of claim 3 where the cantilever assembly is provided with an open end area at its aft end arranged to straddle machinery on the deck structure when the cantilever assembly is in retracted position.

5. An offshore structure provided with a deck structure above the surface of the water comprising:

a cantilever assembly carrying a derrick, draw works and rotary table,     spaced parallel tracks carried by the deck structure and extending horizontally from a point within to adjacent an outboard edge of the deck structure,     spaced parallel slides on the cantilever assembly slidably engaging and supporting the cantilever assembly on the tracks for horizontal movement from a retracted position to an extended position whereby the forward end extends beyond the outboard end of the deck structure when in extended position,     elongated bearing plates pivotally mounted on the deck structure near the outboard end in alignment with and constituting a rocking extension of the tracks,     elongate hold down plates pivotally mounted on the deck structure adjacent the slides near the aft end of the cantilever assembly when in extended position, said elongate hold down plates engageable by and holding down the slides thereby holding down the aft end of the cantilever assembly, said hold down plates being spaced above said slides a distance sufficient to prevent the aft end of the cantilever structure from imposing a load on the deck structure due to bending of the cantilever assembly, the bearing plates and the hold down plates pivoting and assuming the same slope as the portions of the slides engaged by them.

6. The offshore structure of claim 5 where the cantilever assembly is provided with an open area at its aft end between the slides arranged to straddle machinery on the deck structure when in retracted position.

7. The offshore structure of claim 5 including:

a cantilever substructure carried by the forward end of the cantilever assembly, said cantilever substructure carrying the derrick, draw works and rotary table, means slidably mounting the cantilever substructure on the cantilever assembly for moving the cantilever substructure off of the cantilever assembly and onto a platform adjacent the forward end of the cantilever assembly.

8. The offshore structure of claim 7 including:

a drilling assembly carried by the cantilever assembly, said drilling assembly carrying the derrick, draw works and rotary table, and means movably mounting the drilling assembly on the cantilever subassembly for shifting the drilling assembly horizontally on the cantilever subassembly.

9. The offshore structure of claim 8 where the means movably mounting the cantilever subassembly on the cantilever assembly includes:

spaced parallel tracks on the cantilever assembly extending horizontally from a point within to adjacent the forward end of the cantilever assembly, spaced parallel slides on the cantilever subassembly slidably engaging and supporting the cantilever subassembly on the tracks for horizontal movement from a retracted position to an extended position for shifting the cantilever subassembly on the cantilever assembly, a plurality of sets of spaced girders extending parallel to the slides and engaging the slides and supporting the cantilever substructure on the slides, the slides extending the width of each set of the girders, the spacing between the sets of girders generally coinciding with the spacing between support rails on offshore platforms.

10. An offshore structure provided with a deck structure above the surface of the water comprising:

a cantilever assembly, means mounting the cantilever assembly on the deck structure for horizontal movement of the forward end of the cantilever assembly outwardly beyond an outboard edge of the deck structure and for retracting it to its initial position, a cantilever subassembly carried by the forward end of the cantilever assembly, spaced parallel track and slide means for mounting the cantilever subassembly on the cantilever assembly for horizontal movement of the cantilever subassembly beyond and off of the forward end of the cantilever assembly, the cantilever subassembly carrying a derrick, draw works and rotary table.

11. The offshore structure of claim 10 including:

a drilling assembly carried by the cantilever subassembly, said drilling assembly carrying the derrick, draw works and rotary table, and means mounting the drilling assembly on the cantilever subassembly for horizontal translational movement thereon.

12. The offshore structure of claim 10 where the cantilever assembly is provided with an open area adjacent its aft end arranged to straddle machinery on the deck structure when the cantilever assembly is in retracted position.

13. The offshore structure of claim 10 where the means mounting the cantilever subassembly on the cantilever assembly include:

spaced parallel tracks extending horizontally on the cantilever assembly, spaced parallel slides slidably engaging the tracks and supporitng the cantilever subassembly thereon, sets of spaced parallel beams for each slide, each of the sets of beams extending along the lengths of the slides in spaced parallel relationship with one another and with each set spaced to correspond to the spacing of support rails on an offshore platform.

14. An offshore structure provided with a deck structure above the surface of the water comprising:

a cantilever assembly carrying a derrick, draw works and rotary table, spaced parallel tracks carried by the deck structure and extending horizontally from a point within to adjacent an outboard edge of the deck structure, spaced parallel slides on the cantilever assembly slidably engaging and supporting the cantilever assembly on the tracks for horizontal movement from a retracted position to an extended position whereby the forward end extends beyond the outboard end of the deck structure when in extended position, elongate bearing plates pivotally mounted on the deck structure near the outboard end in alignment with and constituting a rocking extension of the tracks, the bearing plates assuming the same slope as the portions of the slides engaged by them.

References Cited

UNITED STATES PATENTS 3,001,592   9/1961   Lucas              61—46.5 X
3,244,242   4/1966   Wolff              61—46.5 X JACOB SHAPIRO, Primary Examiner.

U.S. Cl. X.R.

52—73; 175—5, 9